(No Model.) 2 Sheets—Sheet 1.
A. H. EDDY.
AUTOMATIC COMMUTATOR FOR ALTERNATING ELECTRIC CURRENTS.
No. 391,593. Patented Oct. 23, 1888.

WITNESSES: Arthur H. Eddy, INVENTOR,
BY
McTighe & Worthington,
ATTORNEYS.

(No Model.) 2 Sheets—Sheet 2.

A. H. EDDY.
AUTOMATIC COMMUTATOR FOR ALTERNATING ELECTRIC CURRENTS.

No. 391,593. Patented Oct. 23, 1888.

WITNESSES:
C. W. Benjamin.
J. C. Spaeth.

Arthur H. Eddy. INVENTOR,

BY
McTighe & Worthington.
ATTORNEYS.

UNITED STATES PATENT OFFICE.

ARTHUR H. EDDY, OF HARTFORD, CONNECTICUT.

AUTOMATIC COMMUTATOR FOR ALTERNATING ELECTRIC CURRENTS.

SPECIFICATION forming part of Letters Patent No. 391,593, dated October 23, 1888.

Application filed December 20, 1887. Serial No. 258,519. (No model.)

*To all whom it may concern:*

Be it known that I, ARTHUR H. EDDY, a citizen of the United States, residing at Hartford, in the county of Hartford and State of Connecticut, have invented certain new and useful Improvements in Automatic Commutators for Alternating Electric Currents; and I do hereby declare the following to be a full, clear, and exact description of the invention, such as will enable others skilled in the art to which it appertains to make and use the same.

Many systems of electric lighting are now based upon the use of alternating currents of high potential, which are transformed by converters placed locally into currents of low potential, which are used by consumers for lighting incandescent lamps. The system is generally arranged so that either a converter is placed outside of several buildings and the secondary current distributed therefrom or directly in the building itself. In all cases the current of low potential is alternating in character, and not, *per se*, suitable for the operation of ordinary electric motors. My object is to locally straighten or rectify the direction of such currents and send them into the motor-circuit as a practically continuous current of single direction, and to do this automatically by means of devices maintained in action by the alternating current itself, so that any modification of speed or wave length will be at once communicated to the motor.

The invention accordingly consists in a vibrating motor operated by the alternating current and actuating switching devices adapted to switch all the alternations into a succession of impulses in one direction in the motor-circuit.

The invention further consists in the construction and arrangement of devices organized for the above purpose, all substantially as hereinafter fully described and claimed.

Figure 1:
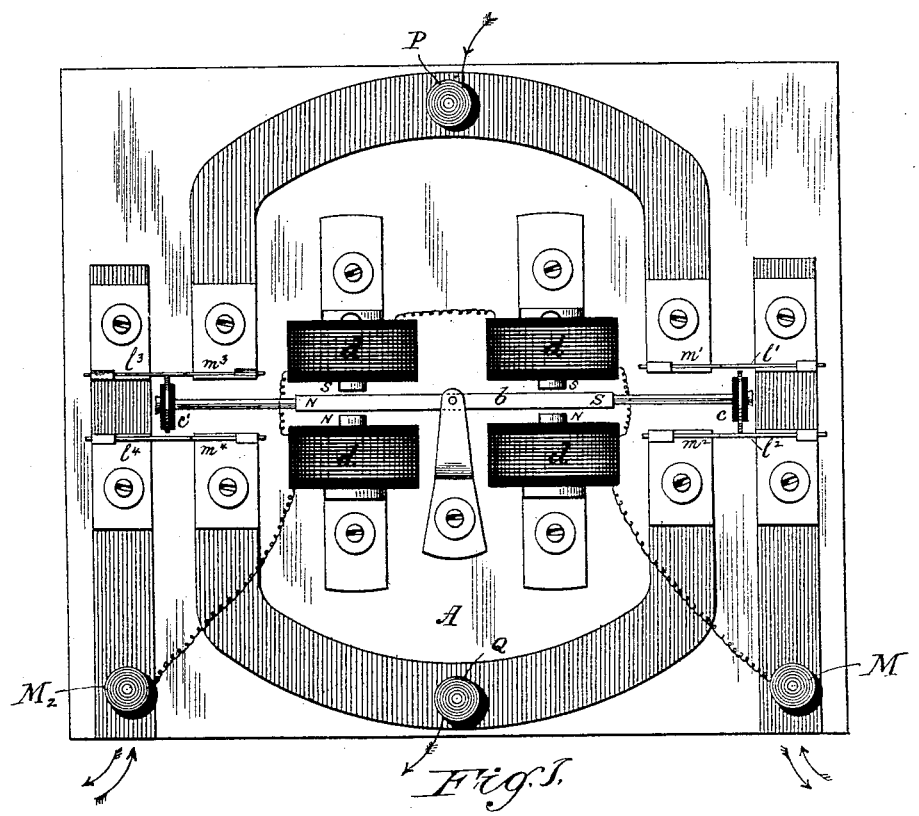

In the drawings, Figure 1 is a plan view of one form of device adapted to accomplish the object of the present invention.

Upon a suitable base, A, I arrange a magnetized steel bar, $b$, pivoted vertically, so as to oscillate horizontally. On extensions at its two ends I place the insulated transverse blades $c\ c'$, respectively. I arrange four electro-magnets, $d$, so that their poles respectively face both sides of the steel bar $b$ at both ends, as shown. Magnets $d$ are of high resistance and are coupled in series directly across the main-line terminals M M, so as to form a permanent derived circuit between the two mains or main branches of the supply-circuit. These magnets $d$ are so connected that at any time the two facing opposite ends of the bar $b$ on the same side are of like polarity, and the two on the opposite face of the bar $b$ are of the opposite polarity, as indicated by the letters N and S in the figure. At one phase of alternation of the line-current, then, the respective ends of bar $b$ are attracted by the diagonally-opposite pair of magnets and repelled by the other pair, and the situation is reversed at the next phase of alternation of the line-current, and so on, thus continually vibrating the bar $b$.

The rectifying of the alternating impulses is effected by means of the blades $c\ c'$ making contact alternately between pairs of contact-springs in their path in the following manner: The main-line terminal M is connected to two contact-springs, $l'\ l^2$, arranged, as shown, to touch the blade $c$ at or near the respective limits of its movement transversely. Similarly the other main-line terminal, $M^2$, is connected to two similarly-arranged contact-springs, $l^3\ l^4$, in proximity to the other blade, $c'$, as shown. In precisely similar relations are four additional contact-springs, $m', m^2, m^3$, and $m^4$. Contacts $m'$ and $m^3$ are connected to terminal P and contacts $m^2\ m^4$ to terminal Q. These terminals P Q then include the electric motor between them. Obviously when the main-line impulse is of one direction the bar $b$ will be so attracted that the blade $c$ closes on contacts $l^2\ m^2$ and the blade $c'$ closes on contacts $l^3\ m^3$. This admits current in a given direction to the motor-circuit through P and Q. When the opposite impulse occurs, the bar $b$ takes the opposite position, closing the blades $c\ c'$, respectively, on contacts $l'\ m'$ and $l^4\ m^4$, and the current admitted to the motor is in the same direction as before. There is thus a continuous succession of impulses all of one direction sent into the motor, which will then operate successfully, and ordinary regulating devices can be used when necessary in the motor-circuit, which would not be possible with alternating impulses. Obviously the motor-circuit is broken for an instant at each alternation; but as the break occurs at the neutral phase, or at the instant the direction is changing, there is little or no tension, and hence no excessive spark occurs.

Figure 2:
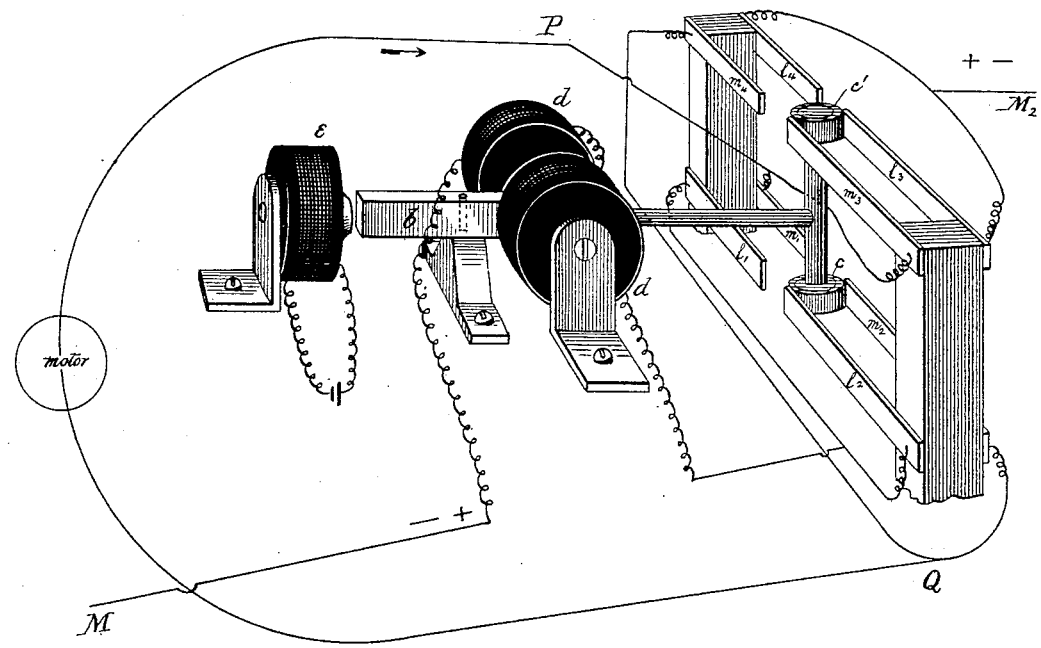

For very high rate of alternations or other purposes it may be desirable to use a soft-iron vibrator. Such a form is shown in Fig. 2 as a perspective diagram. The pivoted soft-iron vibrator has one end between the two electromagnets $d\ d$, which are energized by the main-line alternating current, and its other end swings in inductive proximity to the pole of a permanent or electro magnet, $e$, which latter may be energized by the rectified impulses or by an independent source of current. An extension from the vibrator $b$ carries two insulated metallic rings, $c\ c'$, which perform the functions of the blades similarly lettered in Fig. 1. The connections of the contact-springs and the letters of reference are the same as in Fig. 1. The bar $b$ is polarized by the magnet $e$, and the alternating impulses, actuating magnets $d$, keep the bar in vibration, and its outer extension acts to commutate the currents into impulses of a single direction in the motor-circuit P Q, as shown.

Many other arrangements of devices may be employed to effect the vibration of a switching bar or tongue, and by its vibration cause the straightening of the impulses into one direction for motor-work.

I claim as my invention—

1. The combination, with a main circuit supplying alternating-current impulses, of an electric motor in one derived circuit therefrom, and an electro-magnetic commutating device in another derived circuit and adapted to control the direction of current through the motor-circuit, substantially as described.

2. The combination, with a main circuit supplying alternating-current impulses, of two derived circuits, one including a commutating device actuated by the alternations of current and the other including an electric motor, the direction of whose operative current-impulses is controlled by said commutating device in the other circuit, substantially as described.

3. In a system of electrical distribution by means of alternate currents, the combination, with the main or branch alternating circuit, of an electric motor adapted for operation with current-impulses of a single direction, and an automatic commutator actuated by the alternating impulses delivering straightened or rectified impulses to said motor, substantially as described.

4. The combination, with a main circuit supplying alternating-current impulses, of a polarized electro-magnetic current-rectifier and an electric motor in a circuit derived from said main circuit and supplied with current-impulses of a single direction by said rectifier.

5. A current-rectifier for alternating currents, consisting of two or more fields of magnetism alternating in polarity, a polarized vibrator in said fields, and switching devices operated thereby and adapted to combine said alternating currents into a succession of single-direction impulses, in combination with an electric motor, substantially as described.

6. An alternate-current rectifier consisting of a polarized tongue adapted to vibrate in a field of magnetic polarity alternating synchronously with the alternations of the main current, and suitable switching-contacts in a derived circuit and arranged relatively, substantially as described, whereby the make is at the phase of high potential and the break is at the phase of low potential.

In testimony whereof I affix my signature in presence of two witnesses.

ARTHUR H. EDDY.

Witnesses:
ARTHUR L. BRIGGS,
GEO. T. BRIGGS.